US008892552B1

(12) United States Patent
Hansson et al.

(10) Patent No.: US 8,892,552 B1
(45) Date of Patent: Nov. 18, 2014

(54) DYNAMIC SPECIFICATION OF CUSTOM SEARCH ENGINES AT QUERY-TIME, AND APPLICATIONS THEREOF

(75) Inventors: Othar Hansson, Sunnyvale, CA (US); Matthew D. Wytock, Mountain View, CA (US); Patrick F. Riley, Palo Alto, CA (US); Ramanathan V. Guha, Los Altos, CA (US)

(73) Assignee: Google Inc., Mountain View, CA (US)

( * ) Notice: Subject to any disclaimer, the term of this patent is extended or adjusted under 35 U.S.C. 154(b) by 1243 days.

(21) Appl. No.: 12/046,314

(22) Filed: Mar. 11, 2008

(51) Int. Cl.
*G06F 17/30* (2006.01)

(52) U.S. Cl.
USPC .......................................... 707/732; 707/707

(58) Field of Classification Search
CPC ................................................. G06F 17/30867
USPC .................................... 707/706, 707, 732
See application file for complete search history.

(56) References Cited

U.S. PATENT DOCUMENTS

| | | | |
|---|---|---|---|
| 7,693,817 B2 * | 4/2010 | Dumais et al. | 707/999.002 |
| 7,809,709 B1 * | 10/2010 | Harrison, Jr. | 707/707 |
| 2006/0074883 A1 * | 4/2006 | Teevan et al. | 707/3 |
| 2006/0112079 A1 * | 5/2006 | Holt et al. | 707/3 |
| 2008/0320079 A1 * | 12/2008 | Da Palma et al. | 709/204 |
| 2009/0070318 A1 * | 3/2009 | Song et al. | 707/5 |

OTHER PUBLICATIONS

Riley, Patrick, U.S. Appl. No. 11/874,124, filed Oct. 17, 2007, entitled "System and Method for Query Re-Issue in Search Engines."

'Rollyo: About Rollyo', Rollyo [online], [retrieved on Jan. 16, 2008]. Retrieved from the Internet: <URL:http://rollyo.com/about.html>, 5 pages.

'What is Yahoo! Search Builder ?', Yahoo! Help-Search [online], [retrieved on Jan. 16, 2008]. Retrieved from the Internet: <URL:http://help.yahoo.com/help/us/ysearch/searchbuilder/searchbuilder-01.htrnl>, 1 page.

'About Search Macros', Windows Live Help [online], [retrieved on Jan. 16, 2008]. Retrieved from the Internet: <URL: http://help.live.com/help.aspx?project=wl__searchvl&market=en-US&querytype=keyword&query=sorcam&tmt=&domain=search.live.com##>, 2 pages.

'Custom Search Engine APIs', Google Custom Search Blog [online], [retrieved on Jul. 8, 2008, published on Jun. 26, 2007]. Retrieved from the Internet: <http://googlecustomsearch.blogspot.com/2007/06/custom-search-engine-apis.html>, 4 pages.

'Custom Search Engine', Google Custom Search [online], [retrieved on Jul. 8, 2008, published Aug. 29, 2007]. Retrieved from the Internet: <http://www.google.com/coop/cse/>, 1 page.

* cited by examiner

*Primary Examiner* — Apu Mofiz
*Assistant Examiner* — Chelcie Daye
(74) *Attorney, Agent, or Firm* — Fish & Richardson P.C.

(57) ABSTRACT

A user can issue a query on a search host site. The search host can construct a corresponding reference to custom search engine (CSE) with a URL pointing to a site with information for a CSE specification. The search host sends the reference to a CSE provider and the CSE provider dynamically generates the CSE specification based on the reference. The CSE provider then conducts a search and processes search results accordingly. The processed search results are sent to the search host who outputs the search results for the user. The information for the CSE specification can be stored anywhere accessible in a computer network and can be stored in various formats. Any number of CSE specifications can be automatically generated on demand corresponding to different queries or content requests on the search host site.

20 Claims, 7 Drawing Sheets

DYNAMIC SPECIFICATION OF CUSTOM SEARCH ENGINES AT QUERY-TIME, AND APPLICATIONS THEREOF

FIELD OF THE INVENTION

The present invention relates to network-based search technology, particularly to web-based search engines.

BACKGROUND ART

Search engines are tools that can retrieve information stored in computer networks. Users compose search queries (or simply queries) with certain searching criteria including keywords, phrases, or other conditions, and send the queries to search engines. Once a search engine receives a query, it searches areas in a network to which it has access often using a pre-constructed index of content from that network, and returns results comprising a list of items matching the specified criteria sorted by some relevant measurements. With the help of web technology, users can use browsers to access search engines, input queries, and receive and navigate search results to obtain information according to their interests and needs.

There are different types of search engines to search information for different users. For example, a general-purpose search engine can search a wide range of topics over different web sites. There are also search engines designed to focus on searching in a selected scope of areas. Users can choose the type of search engines according to their interests. However, there are very few options that allow users specifying advanced search criteria to filter the search results to meet their special needs for individual queries.

Recent advances of custom search engines (CSEs) allow the creation of a search engine according to users' needs and preferences. A CSE is defined by a CSE specification that comprises a set of special requirements for a search engine. For example, a developer of a search host site can specify a CSE that includes or excludes specific websites, sets priority to particular keywords and websites, refines search results targeting specific information for a user of the search host site, etc. when using the search engine to conduct search for the user. The search box and results can match the look and feel of the results to the host site's style. Then the requirements are sent to a site providing CSE services (also called a CSE provider), which in turn generate a corresponding CSE specification.

Despite many convenient features of CSEs, they still have certain limitations. First, creating and maintaining a CSE is a manual process. The specification for a CSE, such as included and/or excluded websites, refinement criteria, and look and feel styles, are stored at the CSE provider's site. Every time a developer makes changes to his/her CSE specification, the developer has to update it at the CSE provider's site. Second, it is difficult to create a very large number of CSEs with minor differences targeting different search user groups. Third, it is difficult to programmatically create CSEs using other data sources such as calendar data (e.g. Apple iCal), real-time data feeds (such as RSS), searchable content with attributes (such as Google Base), etc.

BRIEF SUMMARY

Embodiments of the present invention relate to dynamic specification of custom search engines (CSEs). In one embodiment, a user issues a query to a search host. The search host constructs a reference to a CSE based on the query and sends the reference to a CSE to a CSE provider. The CSE provider dynamically generates a corresponding CSE specification and conducts a search based on the dynamically generated CSE specification using a search engine system with one or more underlying search engines. The corresponding search results from the search engine system are then processed by the CSE provider and sent back to the search host. The search host outputs the processed results for the user issued the query.

In an embodiment, the reference to a CSE can be a URL that points to a site in a computer network which contains information regarding a CSE specification. In a further embodiment, the site can be a CSE specification source site that contains a corresponding intermediate CSE specification.

In another embodiment of the invention, the site is a CSE tool scraper that scrapes an intermediate CSE specification based on the reference to the CSE. The intermediate CSE specification may also include another CSE specification by a URL pointing to an included CSE specification source. In such situation, a CSE provider retrieves the included CSE specification from the included CSE specification source and combines the included CSE specification with the intermediate CSE specification. Then the CSE specification is generated based on the intermediate CSE specification.

One feature is to allow the storage of CSE specification information at a desired location in a computer network, so that the CSE specification information can be updated without being uploaded or edited at a CSE provider's site. According to one embodiment of the invention, the CSE provider can generate a CSE specification dynamically when it receives a search request with a reference to a CSE. The information of the CSE specification can be stored in a desired or any combination of formats anywhere accessible in a computer network. Any number of CSE specifications can be automatically generated on demand corresponding to different queries or content requests on the search host site (e.g., using URLs and corresponding parameters).

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left most digit in the corresponding reference number.

DETAILED DESCRIPTION

The present invention relates to systems and methods for dynamically generating specifications for custom search engines. While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The term "URL" used herein refers to a content address. URLs may address content, including, but not limited to web pages, stored across one or more networks, such as the Internet. In another example, a URL may be a path corresponding to a location of a locally stored file. These examples are illustrative and are not intended to limit the definition.

The term "CSE specification" used herein comprises a set of special requirements for customizing a search, such as, including or excluding specific websites, setting priority to particular keywords and websites, and/or refining search results targeting specific information for a user. The CSE specification is used to further customize a user's search query and/or search results returned to a user. In this way, a user's search experience is customized based on the CSE specification and the user receives customized search results compared to using a search engine alone to conduct search. A CSE specification can be in a format including, but not limited to, HTML, XML, RSS, ATOM, OPML, or any combination of these formats or other suitable formats.

A custom search engine (CSE) is a search engine tailored for a user's special needs. A CSE is defined by one or more CSE specifications. A CSE can provide search results tailored or customized according to the specification(s). According to one feature, a specification defining a CSE can be further generated dynamically. A user can be anyone who conducts a search. A user can also be a developer of a search host site to provide custom search via the search host site.

System Overview

Figure 1A:
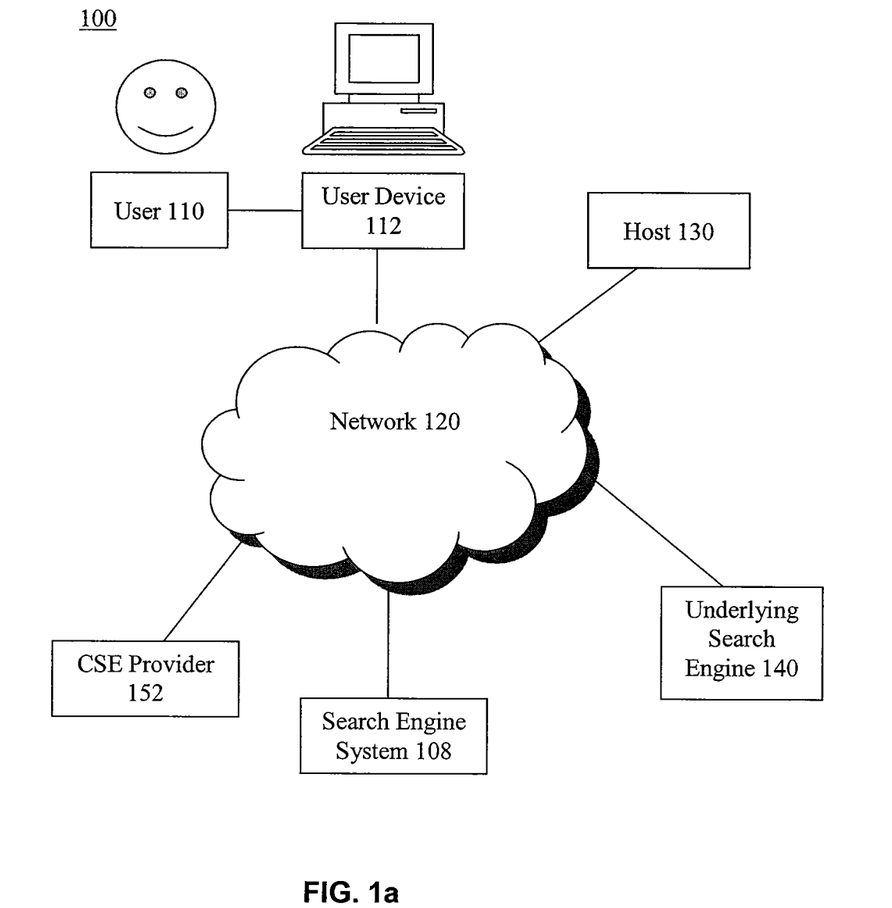
FIG. 1a is a diagram of a system for dynamically generating specifications for custom search engines (CSEs) according to an embodiment of the present invention.

FIG. 1a is a diagram of system 100 for dynamically generating CSE specifications according to one embodiment of the present invention. In FIG. 1a, a user 110 uses a user device 112, which is connected to a search host site (or simply host) 130 through a network 120, to search for information he/she needs. Host 130 is connected via network 120 to a CSE provider 152, which provides CSE services according to users' requirements. CSE provider 152 dynamically generates a CSE specification based on information sent along with a query. In order to conduct a search upon user 110's request, CSE provider 152 also communicates with a search engine system 108 over network 120. Search engine system 108 can be coupled to an underlying search engine 140 through network 120.

In an embodiment of the invention, search engine system 108 and underlying search engine 140 are in accordance with the systems described by Riley et al. in U.S. patent application Ser. No. 11/874,124, filed Oct. 17, 2007, entitled "System and Method for Query Re-Issue in Search Engines," which are incorporated herein by reference in its entirety. The present invention is not limited, however, to using just the search engine systems and underlying search engines described by Riley et al. in U.S. patent application Ser. No. 11/874,124. In general, any search engine system and underlying search engine operating as a custom search engine can be used with system 100 of the present invention. For instance, any custom search engine can be used to carry out a search according to a dynamically-generated specification, as described herein, including but not not limited to a custom search engine with the additional query-reissue feature as described in U.S. patent application Ser. No. 11/874,124.

Networks 120 can be any network or combination of networks that can carry data communication. In addition, network 120 also contains sites that can be accessed for information retrieval. Such networks can include, but are not limited to, local area networks, medium area networks, and/or wide area networks such as the Internet. They can support protocols and technology including, but not limited to, World Wide Web protocols and/or services. Intermediate web servers, gateways, or other servers may be provided between components of system 100 depending upon a particular application or environment.

In one example, CSE provider 152, search engine system 108, and underlying search engine 140 operate on different remote computing devices and communicate with one another over network 120. In another example, CSE provider 152 and search engine system 108 can be combined on one device or coupled locally to one another. In yet another example, search engine system 108 and underlying search engine 140 can be combined on one device or coupled locally to one another. Alternatively, CSE provider 152, search engine system 108, and underlying search engine 140 can be combined altogether on one computing device or connected together locally.

CSE provider 152, search engine system 108, and underlying search engine 140 can each be implemented in software, firmware, hardware, or any combination thereof. In one example, not intended to limit the present invention, CSE provider 152, search engine system 108, and/or underlying search engine 140 can be implemented as a server that can communicate with or is part of a web server (not shown). In this way, user 110 can communicate with CSE provider 152 remotely over the Web through respective browsers running on remote client devices such as user device 112, and host 130.

Figure 1B:
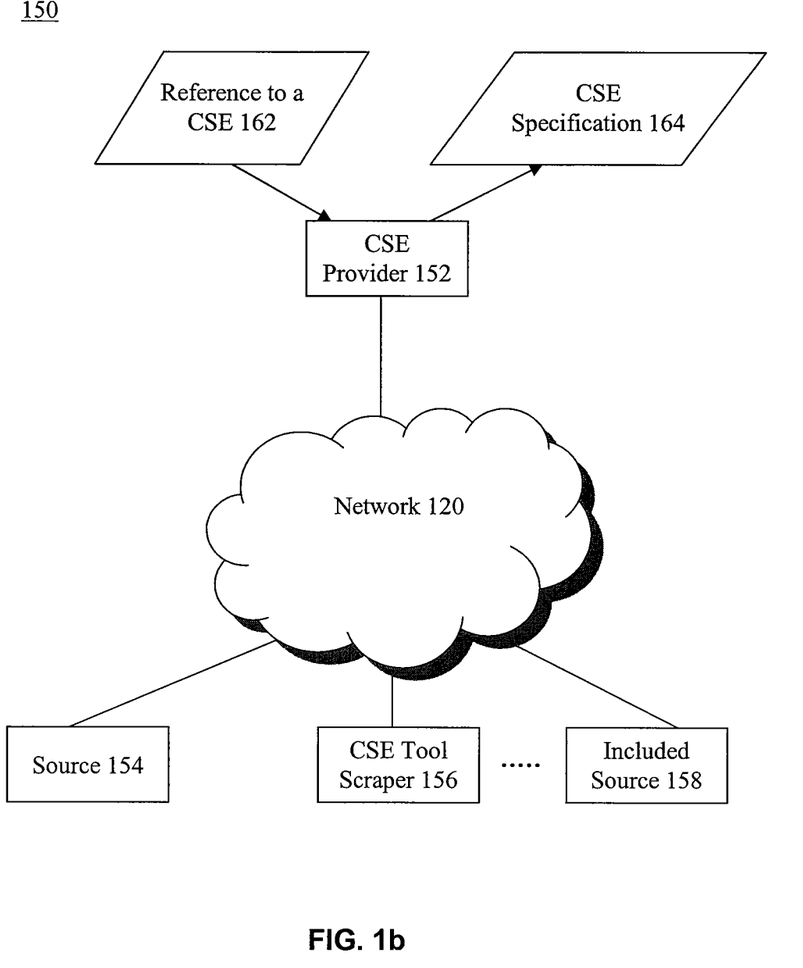
FIG. 1b is a diagram of optional components that can be used for dynamically generating specifications for CSEs according to further embodiments of the present invention.

FIG. 1b is a diagram 150 including other optional components of system 100 for dynamically generating CSE specifications according to further embodiments of the present invention. The optional components may include a source 154, a CSE tool scraper 156, an included source 158, etc. These components are connected with CSE provider 152 and each other through network 120. Source 154 and included source 158 can be any site that contains CSE specification information. CSE tool scraper 156 can be a tool that scrapes one or more webpages for links to be used in the CSE.

In one exemplary embodiment, CSE provider 152 receives a reference to a CSE 162 and dynamically generate a CSE specification 164 by retrieving information from one or more optional components including source 154, CSE tool scraper 156, and/or included source 158.

Previously, to construct a CSE specification for a user of a host, a developer of the host would need to log onto a CSE provider's site and configure the CSE specification for the user through tools provided by the CSE provider. Every time a modification of the CSE specification were needed, the developer had to log onto the CSE provider's site to make the modification. In this way, prior CSE specifications was static or fixed at the time of development and custom searches carried out using these CSE specifications likewise were limited by the static CSE specifications.

In contrast, in one embodiment of the present invention, the developer can specify the CSE with a reference. The reference may contain, for example, a URL that points to a CSE specification file at a specified location. The CSE specification is then dynamically generated when a user of the host issues a query and the query is sent to the CSE provider along with the reference to the CSE. This dynamic generation enables automatic creation or modification of the CSE specification at the time of a search and does not require manual processes as used previously. More up-to-date data available at the time of dynamic generation of a CSE specification can also be used depending upon sources used.

Figure 2:
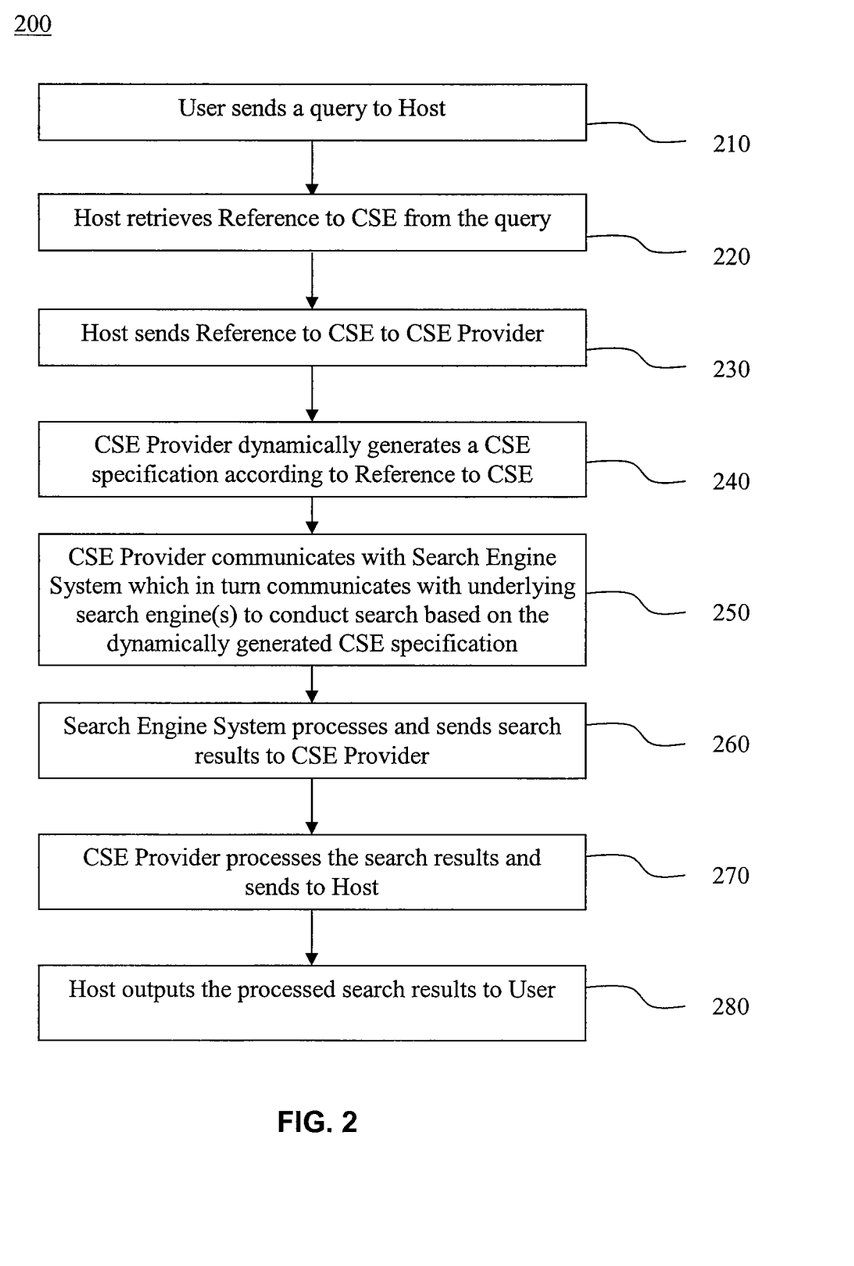
FIG. 2 is a flow chart diagram of an exemplary routine for dynamically generating a CSE specification and conducting a corresponding search according to one embodiment of the invention.
Figure 4:
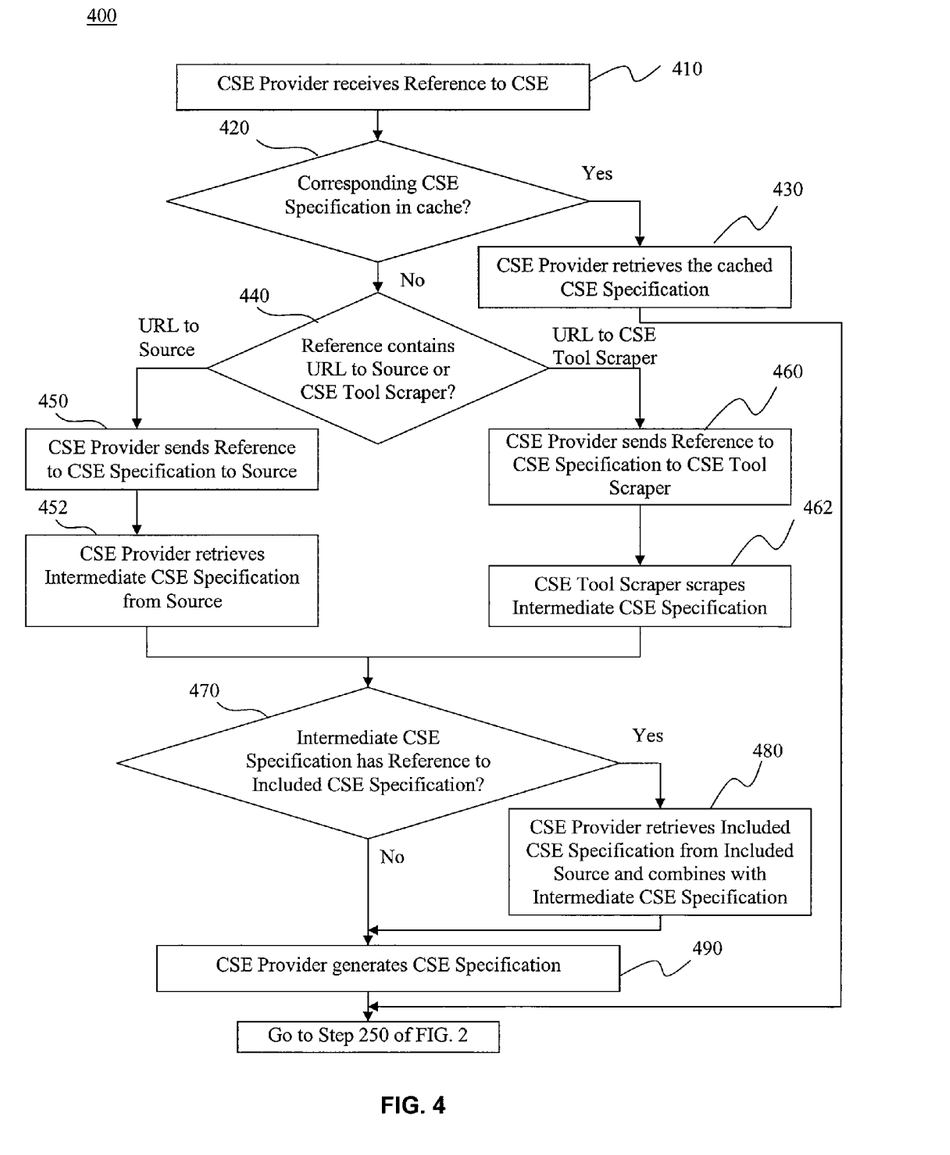
FIG. 4 is a flow chart diagram of an exemplary routine for a CSE provider to construct a CSE specification based on a reference to a CSE according to one embodiment of the invention.
Figure 5:
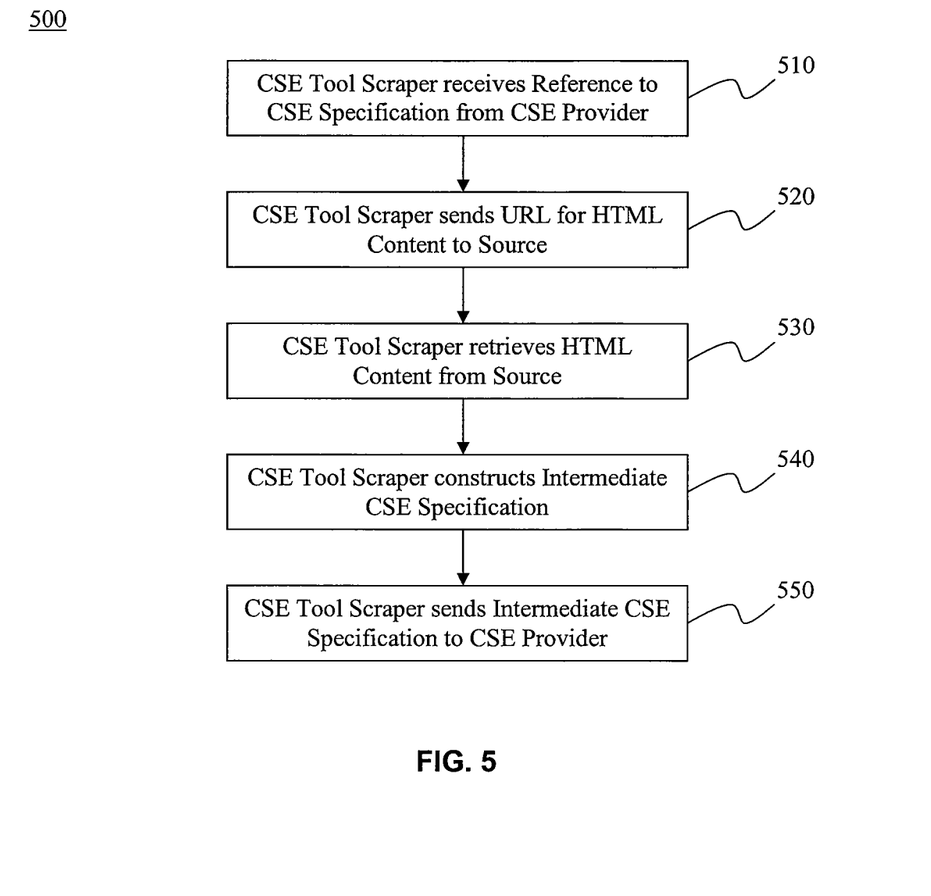
FIG. 5 is a flow chart diagram of an exemplary routine for a CSE tool scraper to scrape an intermediate CSE specification based on a reference to a CSE specification according to one embodiment of the invention.

Embodiments and the operation of the current invention are further described with respect to routines 200, 400 and 500 in FIGS. 2, 4 and 5. Routines 200, 400 and 500 will be described with reference to system 100 in FIGS. 1a and 1b but are not necessarily limited to system 100.

Dynamic Specification of Custom Search Engines

FIG. 2 shows a flow chart diagram of an exemplary routine for dynamically generating a CSE specification and conducting a corresponding search according to one embodiment of the invention. When a user wants a search, the user sends a query to a host that provides search functions at step 210. In one embodiment of the invention, the user can go to the host's search site through a user device such as a computer connected to the host via a network. The host site may be displayed on a display component of the user device. The displayed host site may contain a search box into which the user can input the query or a set of search terms that may match the query. The user can either input in the search box or click on a search term on the search site to issue the query. The user can be, for example, user 110, the user device can be user device 112, and the host can be host 130.

In step 220, the host retrieves a reference to a CSE according to the query. In one embodiment of the invention, the reference to the CSE may be in a hidden form on the host site. In another embodiment of the invention, the reference to the CSE may be stored in a specified location on the host. It can be a Uniform Resource Locator (URL), a blank reference indicating the current page, or a URL with additional information, etc. In one embodiment of the invention, the reference to the CSE can be sent directly from the user device using codes controlled by the host so that search results for the query can be directly sent to the user device without contacting the host.

In step 230, the host sends the retrieved reference to a CSE provider. The CSE provider may be, for example, CSE provider 152.

In step 240, the CSE provider dynamically generates a CSE specification based on the reference to the CSE sent by the host.

One feature is to generate a CSE specification dynamically from information associated with a query issued by the user. In one embodiment of the invention, the CSE specification is generated by a CSE provider. A CSE provider connects with search hosts who use the CSE service provided by the CSE provider to conduct searches for their users. The CSE provider also optionally connects with a CSE specification source, a CSE tool scraper, and/or an included CSE specification source according to the references to CSE sent by the hosts.

FIG. 4 shows a flow chart diagram of an exemplary routine 400 according to one embodiment of the invention in which the CSE provider dynamically generates a CSE specification corresponding to a CSE based on the reference to the CSE sent by a host.

In step 410, a CSE provider, receives a reference to a CSE sent by a host who provides search functions to users. The CSE provider may support several CSEs with different specifications for the host. The CSE provider can be any site that provides CSE services, for example, CSE provider 152.

Because it may not be the first time the host sent the reference to the CSE to the CSE provider, the CSE provider may already have generated the corresponding CSE specification for the reference to the CSE for the host. To avoid generating the CSE specification every time the host sends the same reference to the CSE, the CSE provider first checks, in step 420, its cache for an already generated CSE specification corresponding to the reference to the CSE sent by the host. If its cache already has the corresponding CSE specification, the CSE provider retrieves the corresponding CSE specification in step 430 and goes to Step 250 of FIG. 2. By doing this, the CSE provider avoids constructing the same CSE specification for the same reference to the CSE every time the host sends it.

If no corresponding CSE specifications can be found in the cache, the CSE provider needs to construct a CSE specification based on the reference to the CSE sent by the host. In step 440, the CSE provider analyzes the reference to the CSE to test if it contains a URL to a CSE specification source, such as, source 154 or a URL pointing to a CSE tool scraper, such as, CSE tool scraper 156. In one embodiment of the invention, the CSE tool scraper can be a tool that scrapes one or more webpages for links to be used in the dynamically generated CSE specification. For example, CSE tool scraper if given a reference to a camera web page, such as, a web page hosted by Nikon, may scrape the web page and collect links therein for use in the dynamically generated CSE specification. In this way, links currently present in the Nikon web page are dynamically added in the generation of the CSE specification. This may allow the dynamically generated specification to remain current and evolve to better represent information over time compared to a fixed CSE specification written by a developer long ago.

If the reference to the CSE contains a URL pointing to a CSE specification source, the CSE provider sends a reference to a CSE specification configured based on the reference to the CSE to the CSE specification source in step 450. The reference to the CSE specification can be a file hosted at the CSE specification source site, which contains CSE specification information for the CSE.

In step 452, the CSE provider retrieves an intermediate CSE specification corresponding to the reference to the CSE specification from the CSE specification source. The intermediate CSE specification will be used to construct a final version of the CSE specification.

On the other hand, if the reference to the CSE contains a URL pointing to a CSE tool scraper, in step 460, the CSE provider sends the reference to the CSE specification configured based on the reference to the CSE to the CSE tool scraper.

In step 462, the CSE tool scraper scrapes an intermediate CSE specification according to the reference to the CSE specification sent by the CSE provider and sends it back to the CSE provider.

FIG. 5 illustrates step 462 in FIG. 4 with further details as to how the CSE tool scraper scrapes an intermediate CSE specification according to one embodiment of the invention. In step 510, the CSE tool scraper receives a reference to a CSE specification from the CSE provider. Then in step 520, the CSE tool scraper sends a URL for HTML content, which is retrieved from the reference to the CSE specification, to a CSE specification source specified in the reference to the CSE specification. The CSE tool scraper retrieves the HTML content from the CSE specification source in step 530. In step 540, the CSE tool scraper constructs an intermediate CSE specification based on the reference to the CSE specification and the retrieved HTML content. The constructed intermediate CSE specification is sent back to the CSE provider in step 550. In alternative embodiments, the CSE tool scraper may send a URL for content in other formats to the CSE specification source.

Once the CSE provider has the intermediate CSE specification, it examines whether the intermediate CSE specification has a reference to included CSE specification in step 470. In one embodiment of the invention, the included CSE specification could be a URL that points to an included CSE specification source in a network. If the CSE specification has the reference to included CSE specification, the CSE provider retrieves the included CSE specification from the included CSE specification source and combines the included CSE specification with the intermediate CSE specification in step 480.

If the intermediate CSE specification does not have a reference to included CSE specification, the constructed intermediate CSE specification from step 452 or 462 will be used to generate the CSE specification.

In step 490, the CSE provider generates the CSE specification corresponding to the reference to the CSE based on the intermediate CSE specification from step 452 or 462, or the combination of the included CSE specification and the intermediate CSE specification obtained in step 480.

After the CSE specification is dynamically generated, in step 250, the CSE provider may send the query received from the user with the dynamically generated CSE specification to a search engine system. The search engine system generates a corresponding modified query and communicates with one or more underlying search engines to conduct a search for the user.

In an embodiment of the present invention, after a CSE specification is dynamically generated, it can be used to perform custom search as described for instance in U.S. patent application Ser. No. 11/874,124, filed Oct. 17, 2007, entitled "System and Method for Query Re-Issue in Search Engines," incorporated herein by reference in its entirety. The dynamically-generated CSE specification may have a query modification description and a results modification description.

Query modification description may include information on query modification. For instance, this can include query modification parameters. In one embodiment, query modification (QM) parameters can include one or more parameters to add, to restrict, promote, to demote, or to remove search terms.

In another example, query modification description can include information on query modification that is at an even higher-level (such as, an indication of how certain terms or keywords are to be included, excluded, favored, or disfavored to tune search results) which may more easily specified by a developer of a search host. This information may be later analyzed and automatically converted to QM parameters.

Results modification description may include information on results modification of results returned from an underlying search engine. In particular, this can include result modification parameters. In one embodiment, results modification (RM) parameters can include one or more parameters to restrict, to promote, to demote or to remove results. In another example, results modification description can include information on results modification that is at an even higher-level (such as, an indication of what websites (e.g. URLs or URL patterns) are to be included, excluded, favored, or disfavored in a search to tune search results) which may more easily specified by developer 104. This information can then be later analyzed and automatically converted to RM parameters.

According to one feature, not intended to limit the invention, a dynamically generated CSE specification can be provided in a language that is hierarchical, human readable/editable and machine-readable/editable for direct execution by a machine. Such a language can include, but is not limited to, XML.

In step 260, the search engine system obtains a set of search results for the corresponding search. The search engine system can process a user's search query and/or modify results returned from the underlying search engines based on the CSE specification. The search engine system then sends the modified search results to the CSE provider. In one embodiment of the invention, the modified search results can be in an internal format designed for further processing.

In step 270, the CSE provider processes the search results based on the dynamically generated CSE specification and sends them back to the host. In one embodiment of the invention, the processing of the search results can include simply forwarding the modified results, formatting, or other processing on the output search results.

In step 280, the host outputs the processed search results on the user device for the user. In one embodiment, the host provides a final layout of the processed search results that can be displayed on the user device 112.

Figure 3A:
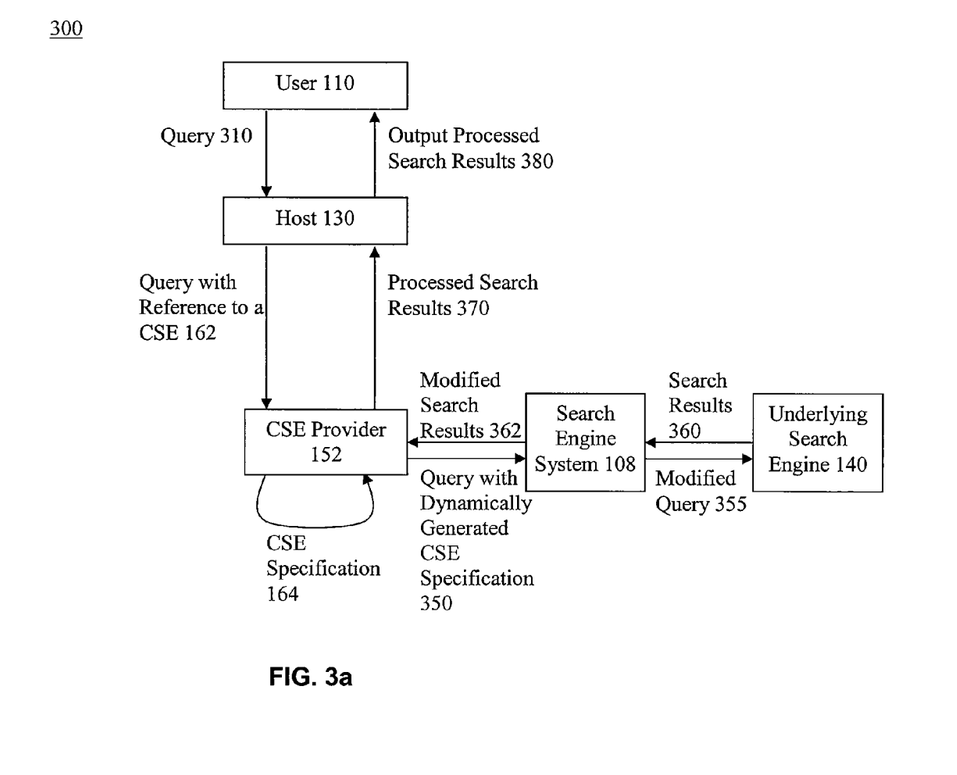
FIG. 3a shows data flow illustrations corresponding to the flow chart diagram of FIG. 2 according to an embodiment of the present invention.
Figure 3B:
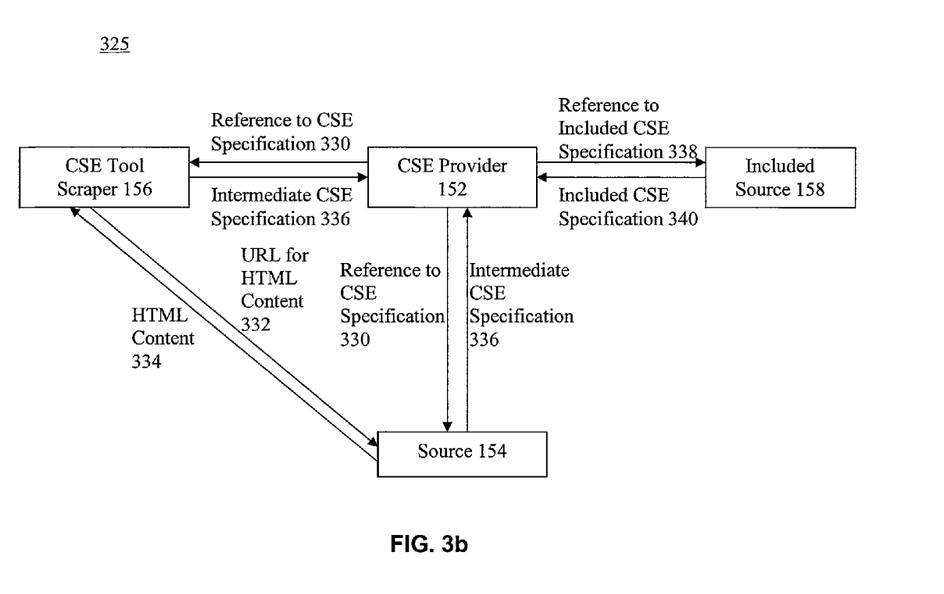
FIG. 3b shows data flow illustrations for dynamically generating a CSE specification according to an embodiment of the present invention.

The data flow for the flow chart of FIG. 2 is further illustrated in FIGS. 3a and 3b.

In FIG. 3a, user 110 sends query 310 to host 130. Host 130 retrieves reference to a CSE 162 based on query 310 and sends the query with reference to a CSE 162 to CSE provider 152. CSE provider 152 processes reference to a CSE 162 and constructs corresponding CSE specification 164. CSE provider 152 then sends a query and dynamically generated CSE specification 350 to search engine system 108. Search engine system 108 constructs a modified query 355 based on the query and the dynamically generated CSE specification 350 and sends it to underlying search engine 140. Underlying search engine 140 conducts a search according to modified query 355 and sends search results 360 back to search engine system 108. Search engine system 108 modifies the search results based on the query and the dynamically generated CSE specification 350 and sends the modified search results 362 to CSE provider 152. CSE provider 152 processes modified search results 362 based on CSE specification 164 and sends processed search results 370 to host 130. Host 130 displays processed search results 370 based on its style 380 for user 110.

FIG. 3b further illustrates the data flow inside CSE provider 152. CSE provider 152 retrieves reference to CSE specification 330 based on reference to a CSE 162 of FIG. 3a. If reference to CSE specification 330 includes URL pointing to the CSE specification source, such as source 154, CSE provider 152 sends reference to CSE specification 330 to source 154 and obtains intermediate CSE specification 336 from source 154. If reference to CSE specification 330 includes URL pointing to CSE tool scraper 156, CSE provider 152 sends reference to CSE specification 330 to CSE tool scraper 156. CSE tool scraper 156 retrieves URL for HTML content 332 from reference to CSE specification 330 and obtains HTML content 334 from source 154 based on URL for HTML content 332. Then CSE tool scraper 156 constructs intermediate CSE specification 336 and sends to CSE provider 152. If intermediate CSE specification 336 includes reference to included CSE specification 338, CSE provider 152 will send reference to included CSE specification 338 to the included CSE specification source, included source 158, and retrieve included CSE specification 340. Included CSE specification 340 will then be combined with intermediate CSE specification 336 to generate CSE specification 164.

Previously the CSE specification was hosted by a CSE provider. The user needed to go to the CSE provider's site to make any changes. It is desirable to store CSE specification information somewhere else in a computer network so that the CSE specification information can be updated without being uploaded or edited at the CSE provider's site. Accordingly, with embodiments of this invention, the CSE provider can generate a CSE based on CSE specification(s) dynamically when it receives a search request with reference to the CSE. Such configuration would allow constructing CSEs from any combination of different sources of links such as HTML, RSS, ATOM, OPML, etc. It would also allow a developer to automatically generate any number of CSEs on demand in response to a query or content request on his/her search host site.

In one embodiment of the invention, a reference to the CSE may contain a single URL. The contents referred by the URL may be in the form of a RSS feed, which can be in a web feed format used to publish frequently updated content such as blog entries and news headlines over the World Wide Web. The URL can also point to a HTML page to scrape links, a HTML page containing XML specifications for a CSE, an XML file containing a CSE specification, or a URL for a script that returns any of the above mentioned forms of data. The URL can even point to a reference that does not contain any specific instructions. In such a situation, the CSE could be generated based on queries that return that reference as a high-ranking result. If the URL is a blank URL, the CSE can be generated according to the referring page. The URL can also be a relative URL that does not contain a full address, which will result in a generated CSE that includes a search box on any content of a site driven by the relative URL corresponding to a CSE specification file.

EXAMPLES

Reference to a CSE:

In one embodiment of the invention, a reference to a CSE can be in one of the following formats:

cref=http://mysite.com/my_cse.xml;

cref=http://csewizard.com/html_to_cse?src=http://joe.googlepages.com/page_o_li nks.html;

cref=http://csewizard.com/combine_cses?src=http://joe.googlepages.com/favorite_cses.html; or cref=http://csewizard.com/better_than_pfe/joe_smith/cse1.

CSE Speciciation:

In one exemplary embodiment, a CSE specification can have the following format:

<CustomSearchEngine>
<DisplayContext>
... [parameters] ...
</DisplayContext>
<Annotations>
<Annotation about="*.school1.edu/*"/>
<Annotation about="*.school2.edu/*"/>
...
</Annotations>
</CustomSearchEngine>

In another exemplary embodiment, a CSE specification can have the following format that uses bundles and included files:

<CoopContent>
<CustomSearchEngine> ... </CustomSearchEngine>
<Include type="Annotations" href="http://csewizard.com/grab_links?src=http://joe.googlepages.com/favoritelinks.html">
<Include type="Annotations" href="http://www.acme.com/joint_cse/annos.xml">
<Include type="Annotations" href="http://www.well.com/~oh/joint_cse/othars-annos.xml">
<Annotations>
<Annotation about="*.school1.edu/*"/>
<Annotation about="*.school2.edu/*"/>
...
</Annotations>
</CoopContent>

The use of bundles and included files allows the CSEs to be created from multiple parts, including annotations provided by others or by a set of URLs. The top-level "CoopContent" XML file can be easily controlled by a user or developer.

CONCLUSION

Previously, creating a large number of CSEs through an interface on a CSE provider's site was a challenging task. With the current invention, a developer of a search host site can provide a set of references to CSE specifications corresponding to a set of different CSEs to be created for different users of the host, and the set of CSEs can be constructed automatically by the CSE provider based on the set of references to CSE specification.

The current invention also allows a reference to a CSE to be a URL in a web feed format such as calendar data (e.g. Apple iCal), real-time data feeds (such as RSS), searchable content with attributes (such as Google Base), etc. This provides options of using data sources different than XML/HTML to generate CSEs dynamically.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicants therefore rescind any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A system comprising:
a custom search engine provider including one or more computing devices configured to perform operations comprising:
receiving a first search query and a first reference to a custom search engine, wherein the first reference links to information for a custom search engine specification;
dynamically generating the custom search engine specification based on the information and the first search query, wherein generating the custom search engine specification comprises:
scraping one or more webpages for links by a custom search engine tool scraper, wherein the one or more webpages are identified by the information;
constructing an intermediate custom search engine specification at least from the links; and
generating the custom search engine specification based on the intermediate custom search engine specification; and
providing custom search results in response to the first search query by: (i) obtaining search results in response to the first search query from a search engine, modifying the search results obtained in response to the first search query according to the custom search engine specification, and providing the modified search results as the custom search results, (ii) modifying the first search query according to the custom search engine specification to generate a modified search query, obtaining search results in response to the modified search query from the search engine, and providing the search results obtained in response to the modified search query as the custom search results, or (iii) modifying the first search query according to the custom search engine specification to generate a modified search query, obtaining search results in response to the modified search query from the search engine, modifying the search results obtained in response to the modified search query according to the custom search engine specification, and providing the modified search results as the custom search results.

2. The system of claim 1, wherein the first reference to the custom search engine comprises a Uniform Resource Locator (URL), and wherein the information includes information for the intermediate custom search engine specification.

3. The system of claim 2, wherein the custom search engine specification is generated from a custom search engine specification source, and wherein the custom search engine specification source is a web site.

4. The system of claim 3, wherein the URL points to the custom search engine specification source.

5. The system of claim 2, wherein the URL points to the custom search engine tool scraper.

6. The system of claim 2, wherein the intermediate custom search engine specification includes a second reference to an included custom search engine specification, wherein the included custom search engine specification is contained in an included custom search engine specification source, and wherein the included custom search engine specification source is a web site.

7. The system of claim 6, wherein the custom search engine provider is further configured to:
generate the intermediate custom search engine specification according to the information;
retrieve the second reference from the intermediate custom search engine specification;
obtain, with the retrieved second reference, the included custom search engine specification from the included custom search engine specification source; and
combine the included custom search engine specification with the intermediate custom search engine specification to dynamically generate the custom search engine specification.

8. The system of claim 1, wherein the custom search engine provider is further configured to:
send a query with at least one dynamically generated custom search engine specification to a search engine system; and
process corresponding search results received from the search engine system based on the dynamically generated custom search engine specification.

9. A method comprising:
receiving a first search query and a first reference to a custom search engine;
dynamically generating, using one or more computing devices, a custom search engine specification using (i) information referenced by the first reference to the custom search engine and (ii) the first search query, where the dynamic generation occurs when a user issues the first search query to the custom search engine, and where the generating comprises:
scraping one or more webpages for links by a custom search engine tool scraper, where the one or more webpages are identified by the information;
constructing an intermediate custom search engine specification at least from the links; and
generating the custom search engine specification based on the intermediate custom search engine specification; and
providing custom search results in response to the first search query by: (i) obtaining search results in response to the first search query from a search engine, modifying the search results obtained in response to the first search query according to the custom search engine specification, and providing the modified search results as the custom search results, (ii) modifying the first search query according to the custom search engine specification to generate a modified search query, obtaining search results in response to the modified search query from the search engine, and providing the search results obtained in response to the modified search query as the custom search results, or (iii) modifying the first search query according to the custom search engine specification to generate a modified search query, obtaining search results in response to the modified search query from the search engine, modifying the search results obtained in response to the modified search query according to the custom search engine specification, and providing the modified search results as the custom search results.

10. The method of claim 9, wherein the first reference to a custom search engine comprises:
a Uniform Resource Locator (URL) pointing to information for the custom search engine specification.

11. The method of claim 10, wherein dynamically generating a custom search engine specification comprises:
retrieving a second reference to the custom search engine specification from the received first reference to a custom search engine;
obtaining an intermediate custom search engine specification based on the retrieved second reference to the custom search engine specification; and
processing the obtained intermediate custom search engine specification to obtain the dynamically generated custom search engine specification.

12. The method of claim 11, wherein the retrieved second reference to a custom search engine specification comprises a URL pointing to a custom search engine specification source.

13. The method of claim 12, wherein obtaining an intermediate custom search engine specification based on the retrieved second reference to a custom search engine specification comprises:
obtaining the intermediate custom search engine specification from the custom search engine specification source based on the retrieved second reference to a custom search engine specification.

14. The method of claim 11, wherein the retrieved second reference to a custom search engine specification comprises a URL pointing to a custom search engine tool scraper.

15. The method of claim 14, wherein obtaining the custom search engine specification based on the retrieved reference to a custom search engine specification comprises:
sending the retrieved second reference to a custom search engine specification to the custom search engine tool scraper, wherein the custom search engine tool scraper constructs the intermediate custom search engine specification based on the second reference to a custom search engine specification; and
obtaining the constructed intermediate custom search engine specification from the custom search engine tool scraper.

16. The method of claim 11 wherein processing the obtained intermediate custom search engine specification to obtain the dynamically generated custom search engine specification further comprises:
retrieving a third reference to an included custom search engine specification from the obtained intermediate custom search engine specification, wherein the third reference to an included custom search engine specification comprises a URL pointing to an included custom search engine specification source;
retrieving the included custom search engine specification from the included custom search engine specification source; and
combining the included custom search engine specification with the obtained intermediate custom search engine specification to dynamically generate the custom search engine specification.

17. The method of claim 9, further comprising:
conducting a search at a search engine system with one or more underlying search engines based on the dynamically generated custom search engine specification; and
processing corresponding search results from the search engine system based on the dynamically generated custom search engine specification.

18. The method of claim 17, wherein conducting a search at a search engine based on the dynamically generated custom search engine specification comprises:
sending one or more dynamically generated custom search engine specifications to a search engine system; and
receiving search results from the search engine system.

19. A method performed by a system of one or more computers, the method comprising:
receiving a request that includes a first search query and a first reference to a custom search engine, wherein the first reference specifies information to be used in generating a specification for the custom search engine;
in response to receiving the request, generating a custom search engine specification for the custom search engine based on the information specified by the received first reference, wherein the generating comprises:
scraping one or more webpages for links by a custom search engine tool scraper, where the one or more webpages are identified by the information;
constructing an intermediate custom search engine specification at least from the links; and
generating the custom search engine specification based on the intermediate custom search engine specification; and
providing custom search results in response to the first search query, wherein providing the custom search results comprises: (i) obtaining search results in response to the first search query from a search engine, modifying the search results obtained in response to the first search query according to the custom search engine specification, and providing the modified search results as the custom search results, (ii) modifying the first search query according to the custom search engine specification to generate a modified search query, obtaining search results in response to the modified search query from the search engine, and providing the search results obtained in response to the modified search query as the custom search results, or (iii) modifying the first search query according to the custom search engine specification to generate a modified search query, obtaining search results in response to the modified search query from the search engine, modifying the search results obtained in response to the modified search query according to the custom search engine specification, and providing the modified search results as the custom search results.

20. A system comprising:
one or more computing devices configured to:
receive a request that includes a first search query and a first reference to a custom search engine, wherein the first reference specifies information to be used in generating a specification for the custom search engine;
in response to receiving the request, generate a custom search engine specification for the custom search engine based on the information specified by the received first reference, where the generating comprises:
scraping one or more webpages for links by a custom search engine tool scraper, where the one or more webpages are identified by the information;

constructing an intermediate custom search engine specification at least from the links; and generating the custom search engine specification based on the intermediate custom search engine specification; and provide custom search results in response to the first search query, wherein the one or more computing devices are operable to provide the custom search results by (i) obtaining search results in response to the first search query from a search engine, modifying the search results obtained in response to the first search query according to the custom search engine specification, and providing the modified search results as the custom search results, (ii) modifying the first search query according to the custom search engine specification to generate a modified search query, obtaining search results in response to the modified search query from the search engine, and providing the search results obtained in response to the modified search query as the custom search results, or (iii) modifying the first search query according to the custom search engine specification to generate a modified search query, obtaining search results in response to the modified search query from the search engine, modifying the search results obtained in response to the modified search query according to the custom search engine specification, and providing the modified search results as the custom search results.

* * * * *